(12) United States Patent
Koelmel et al.

(10) Patent No.: US 10,725,722 B1
(45) Date of Patent: Jul. 28, 2020

(54) MODULAR MULTIPLE DISPLAY ELECTRONIC DEVICES

(71) Applicant: Apple Inc., Cupertino, CA (US)

(72) Inventors: Blake R. Koelmel, Mountain View, CA (US); Craig C. Leong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/125,371

(22) Filed: Sep. 7, 2018

Related U.S. Application Data

(60) Provisional application No. 62/556,203, filed on Sep. 8, 2017.

(51) Int. Cl.
*G06F 3/14* (2006.01)
*H05K 5/02* (2006.01)
*H05K 5/00* (2006.01)
*G06F 1/16* (2006.01)

(52) U.S. Cl.
CPC .......... *G06F 3/1446* (2013.01); *G06F 1/1616* (2013.01); *G06F 1/1626* (2013.01); *G06F 1/1649* (2013.01); *G06F 1/1683* (2013.01)

(58) Field of Classification Search
CPC combination set(s) only.
See application file for complete search history.

(56) References Cited

U.S. PATENT DOCUMENTS

| | | | |
|---|---|---|---|
| 9,066,042 B2 | 6/2015 | Yang et al. | |
| 2013/0335325 A1* | 12/2013 | Lee | G06F 1/1615 345/161 |
| 2014/0327630 A1* | 11/2014 | Burr | G06F 3/0488 345/173 |
| 2016/0125837 A1* | 5/2016 | Huang | G06F 3/1438 345/3.1 |
| 2016/0219217 A1* | 7/2016 | Williams | H04N 5/23293 |
| 2016/0342373 A1* | 11/2016 | Huang | G06F 3/1446 |

* cited by examiner

*Primary Examiner* — Deeprose Subedi
(74) *Attorney, Agent, or Firm* — Dickinson Wright RLLP

(57) ABSTRACT

Electronic computer systems are described. In particular embodiments, the electronic systems include a first electronic device having a first display and first computing resources and a second electronic device having a second display and second computing resources. The electronic systems also include a coupling element that is configured to mechanically couple and provide a communication path between the first electronic device and the second electronic device. In a coupled configuration, the first computing resources are available for use by the second electronic device via the communication path such that the first display is operable as a primary display capable of presenting visual content in accordance with the first and second computing resources, and the second display is operable as a secondary display that is capable of providing data for operation of the coupled configuration.

20 Claims, 14 Drawing Sheets

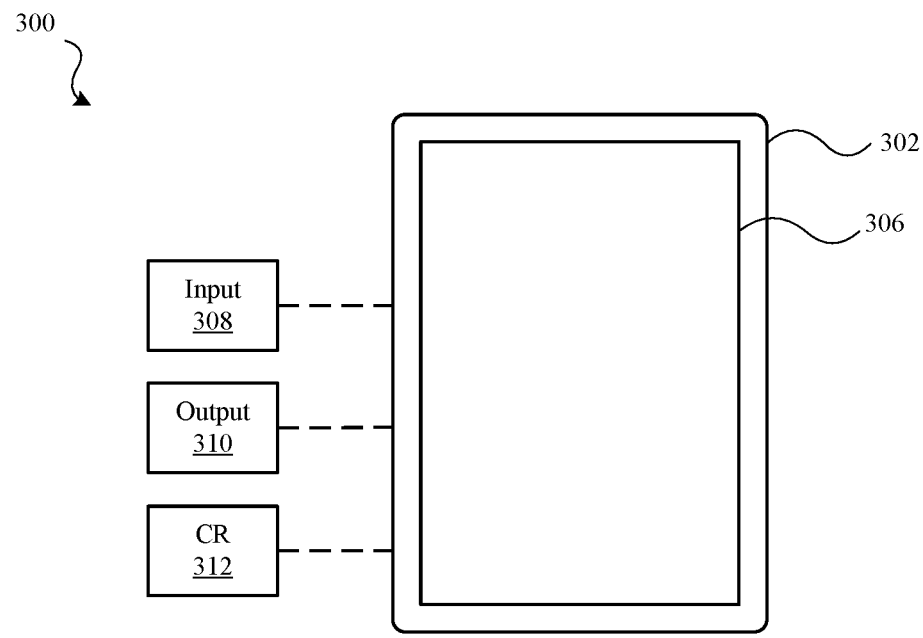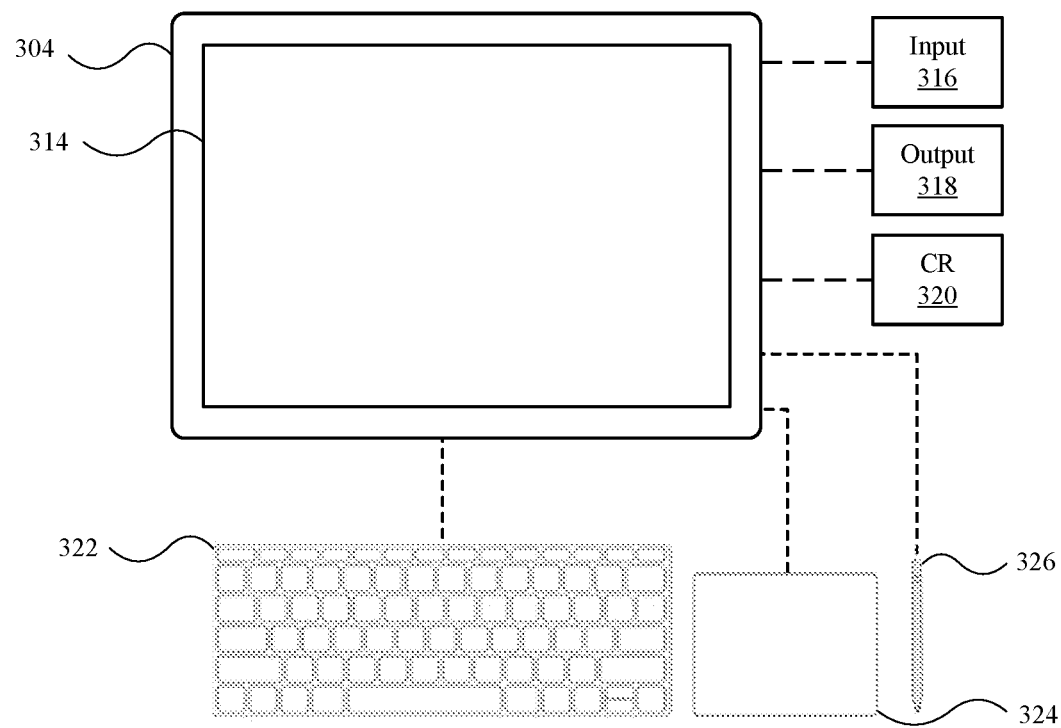
FIG. 3

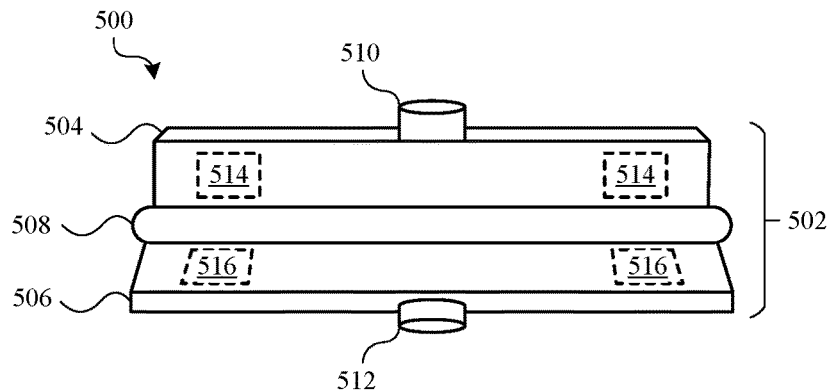
*FIG. 5*
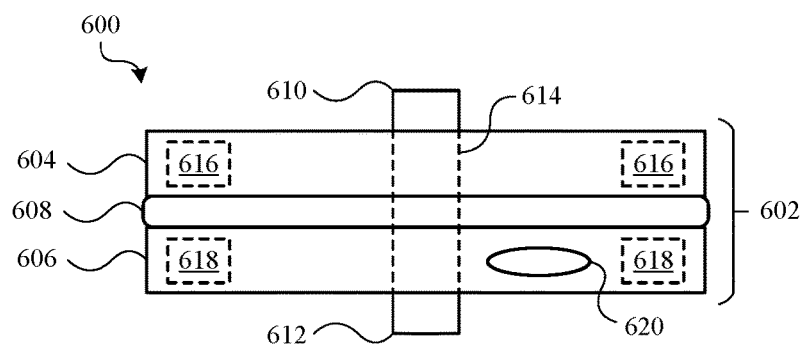
*FIG. 6*
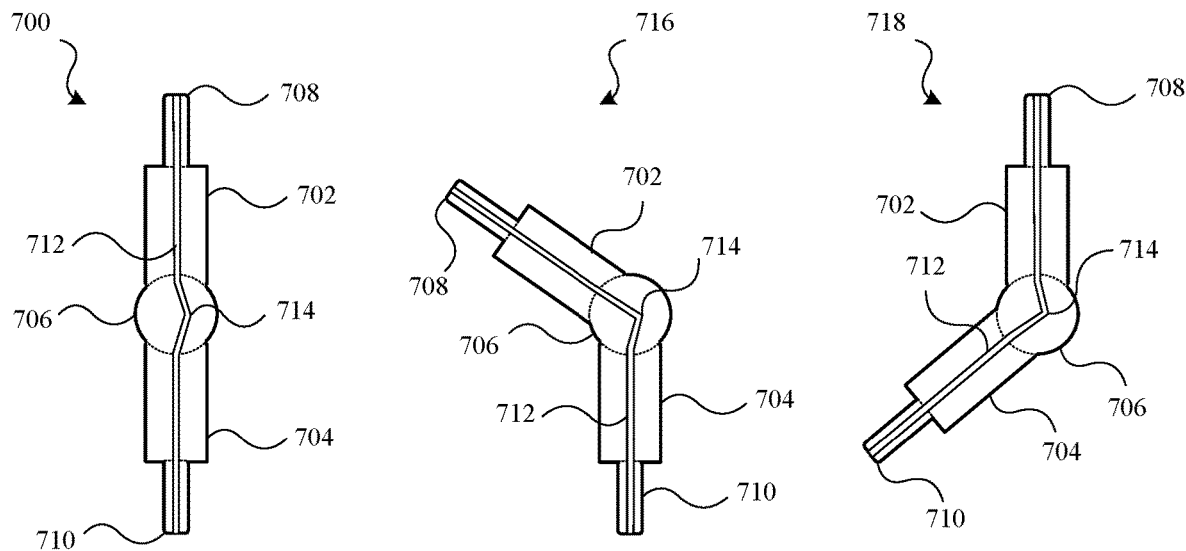
*FIG. 7A*      *FIG. 7B*      *FIG. 7C*

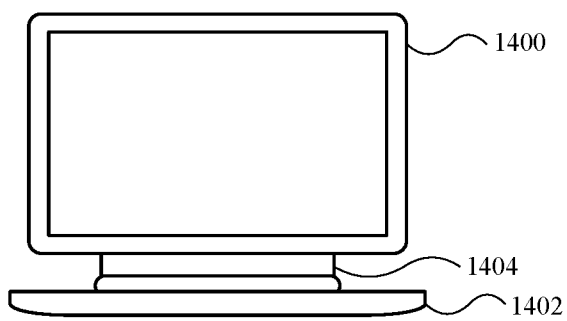
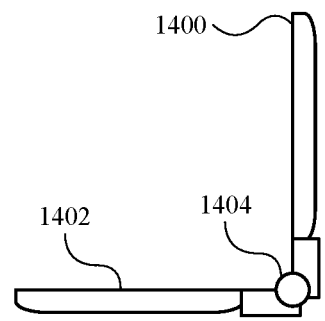
FIG. 14A  FIG. 14B
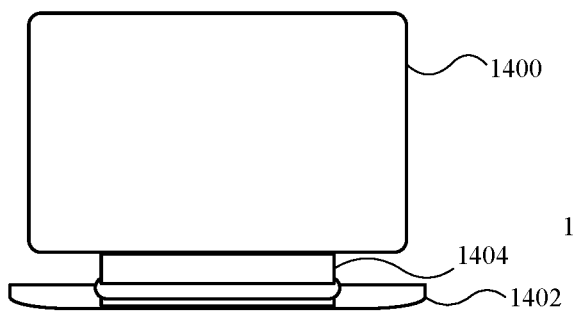
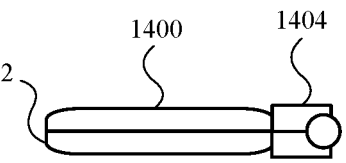
FIG. 14C  FIG. 14D

MODULAR MULTIPLE DISPLAY ELECTRONIC DEVICES

CROSS-REFERENCE TO RELATED APPLICATIONS

The present application claims the benefit of U.S. Provisional Application No. 62/556,203, entitled "MODULAR MULTIPLE DISPLAY ELECTRONIC DEVICES," filed Sep. 8, 2017, the content of which is incorporated herein by reference in its entirety for all purposes.

FIELD

The described embodiments relate generally to coupling multiple electronic devices. More particularly, the described embodiments relate to coupling independently operable electronic devices for combined operation.

BACKGROUND

Electronic devices incorporate a variety of electrical components that can each provide different functions. Many electronic devices are available as individually operable units. However, depending on the type of electronic device or the environment in which the device is intended to operate, the operational capabilities of the electronic device may be limited. A typical solution is to obtain or replace the less capable device with more powerful devices, but this can be costly and inefficient due to the quickly advancing nature of computing technology. Thus, there exists a need for expanding use of electronic devices in multiple systems or for multiple purposes.

SUMMARY

Some embodiments of the present invention can include electronic computer systems. The computer systems include a first electronic device having a first display and first computing resources, a second electronic device having a second display and second computing resources, and a coupling element configured to mechanically couple and provide a communication path between the first electronic device and the second electronic device. In a coupled configuration where the first and second electronic devices are mechanically coupled by the coupling element, the first computing resources are available for use by the second electronic device via the communication path such that the first display is operable as a primary display capable of presenting visual content in accordance with the first and second computing resources, and the second display is operable as a secondary display that is capable of providing data for operation of the coupled configuration.

Further embodiments of the present invention include coupling elements for coupling a first electronic device having first computing resources and a first display, and a second electronic device having second computing resources and a second display. The coupling elements include a body element including a first part having a first securing feature capable of attaching to the first electronic device and a second part having a second securing feature capable of attaching to the second electronic device, as well as a communication path positioned between the first part of the body element and the second part of the body element, the communication path being configured to link the first electronic device and the second electronic device in communication with each other. The first electronic device and the second electronic device can be enabled to share their respective computing resources using the communication path provided by the coupling element when the first electronic device and the second electronic device are attached to the body element by way of the first securing feature and the second securing feature, respectively.

Additional embodiments of the present invention include an electronic device. The electronic device includes a first display, a communication port, and first computing resources including one or more of processing power, dynamic random access memory, memory storage capacity, or graphical processing memory. When a first connector of a coupling element is connected to the communication port and a second connector of the coupling element is connected to a computing device having second computing resources, the computing device and the electronic device are operable together and enabled to share the first and second computing resources.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 3 illustrates multiple electronic devices of varying operational capabilities.

FIG. 5 is a front view of a coupling element.

FIG. 6 is a top, partially transparent view of a coupling element.

FIGS. 7A, 7B, and 7C are side, cross-sectional views of example coupling elements in various rotational orientations.

FIGS. 14A, 14B, and 14C are views of electronic devices in a coupled configuration.

FIG. 14D is a side view of coupled electronic devices in a closed position.

DETAILED DESCRIPTION

Figure 1A:
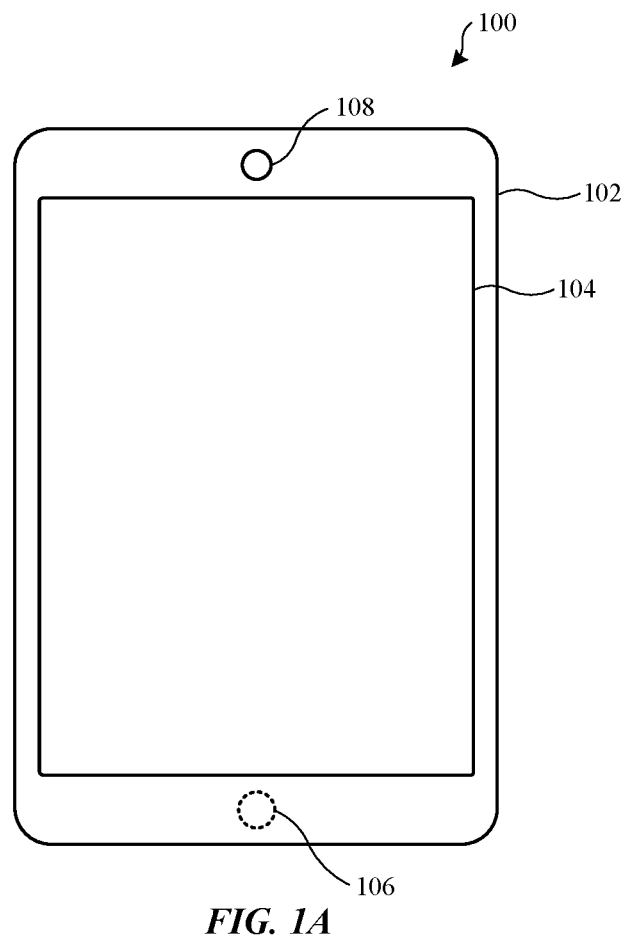
FIG. 1A illustrates in top plain view an exemplary electronic device according to various embodiments of the present disclosure.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made without departing from the spirit and scope of the described embodiments.

Many electronic devices have been designed to be more compact while also providing increased functionality of the computing devices. Computing devices have also been designed to provide an improved user experience. With the availability of multiple computing devices, utilization of such devices in coupled configurations can be advantageous, as computing resources of the devices are shared and distributed, improving the user experience for existing devices.

A coupled system includes multiple electronic devices, such as a first electronic device and a second electronic device, as well as a coupling element. Each of the electronic devices is operationally independent of the other, and each of the electronic devices have computing resources associated therewith. The coupling element or mechanism can both physically couple the devices together in a coupled configuration and provide a communication link between the two devices.

With the communication link established and the devices physically coupled, the computing resources of each device are shared (or used to augment one device) in accordance with the desired operation of the devices in the coupled configuration. Power transfer management can also be performed, such that power usage between the devices can be optimized and energy can be transferred between the two devices. Furthermore, the individual components of the electronic devices can have altered functionality when coupled. In some examples, one electronic device is designated to operate solely as a display (e.g., a primary display), while computing functions, as well as data input, are mainly handled by the second electronic device.

The coupling element includes connectors, such as USB connectors, that establish the communication link between the electronic devices. The connectors, as adapted for physical engagement with receptor ports on the electronic devices, can also act as physical securing features, securing the electronic devices to the coupling element. Furthermore, the coupling element can also include magnetic elements adapted to form magnetic circuits with magnets placed in the electronic devices, thereby also providing magnetic securing features for coupling the electronic devices. The coupling elements can also include lip portions, engagement surfaces, kick stands, and other features to provide weight balancing and ergonomically desired configurations.

Once coupled and having the communication link established, an operational mode for each of the electronic devices can be selected to maximize the efficiency of the coupled system or to operate in accordance with a physical orientation of the electronic devices. As the computing resources of each of the electronic devices can be different, if a device is dedicated to a particular operation, the computing resources of one device can be available for use by the other electronic device. A selection of operational modes can designate an amount of computing resources to be shared between devices or an amount of operations to limit a particular device to perform, such that the devices in the coupled configuration perform as expected.

Embodiments of the present invention include computer devices, such as tablets, laptops, cellular phones, smart phones, and other devices that utilize magnets or magnetic assemblies.

These and other embodiments are discussed below with reference to FIGS. 1A-15; however, those skilled in the art will readily appreciate that the detailed description given herein with respect to these figures is for explanatory purposes only and should not be construed as limiting.

Figure 1B:
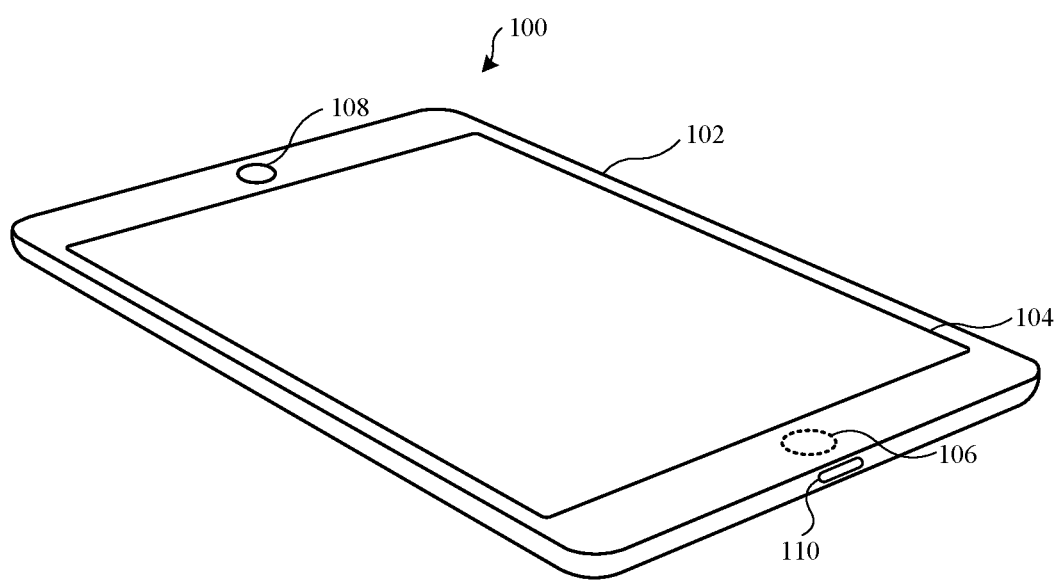
FIG. 1B illustrates in front isometric view the electronic device of FIG. 1A in accordance with various embodiments of the present disclosure.

FIG. 1A shows a top view of a representative electronic device 100 and FIG. 1B shows an isometric view of the representative electronic device 100. Electronic device 100 can be a tablet computing device, for example, although other similar types and varieties of electronic devices can include the components and features disclosed herein. For example, the various embodiments disclosed herein could also be used with a smart phone, a media playback device, a personal digital assistant, and a laptop computer, among other possible portable electronic devices. The electronic device 100 can include a housing 102. The housing 102 defines an internal cavity that carries internal components and circuitry, such as circuit boards, memory, batteries, processor(s) and other electronic components. The housing 102 can be formed from a metal (or metals), such as aluminum or an alloy that includes aluminum. Other materials are also possible, such as a rigid plastic or ceramic, or composites thereof.

The housing 102 can also provide space for an exterior touchscreen or other display assembly 104, one or more buttons, such as a home button 106, a camera 108, and a connector input 110, among other possible device components. The display assembly 104 is designed to present visual information, in the form of images and/or video. The display assembly 104 can include a capacitive touch sensitive layer designed to receive a touch input to alter the visual information. In some embodiments, the home button 106 can be virtual and is optionally included with the electronic device 100. In embodiments where the device 100 is provided with a touch display or touch-screen, the display 104 can have touch capabilities well suited for receiving a touch event, emulating capabilities of a home button 106 (e.g., via a virtual home button presented on the touch-screen), and/or, in embodiments where the device 100 includes a haptic device, providing haptic feedback as a touch event, that can be used, for example, to control various operation of the electronic device, if appropriately configured.

Electronic device 100 can additionally include various buttons used as user control inputs of electronic device 100. The buttons can be carried by the electronic device at different locations along the housing at different openings of the housing. As a non-exclusive and non-limiting example, a home button 106 can be located on a surface of housing 102. Additional buttons that are not shown in FIGS. 1A-1B can also be carried by electronic device 100.

The connector input 110 is shown located at the base or bottom of the device 100. Alternatively, the connector input 110 can be located on other sides of the device 100, on the front or rear surfaces of the device 100, etc. The connector input 110, which may be alternatively referred to herein as a port or communications port, is shown as an opening in the housing 102 of the device 100, and is configured to receive a cable connector and/or other connections to external, secondary electronic devices and accessories. In some embodiments, the connector input 110 receives or engages with a securing element or attachment mechanism of an external/accessory device such that the connector input 110 acts as a mechanical engagement mechanism for the electronic device 100.

The connector input 110 is electronically coupled to internal components of the device 100 to facilitate transfer of power, data, computing resources, etc., as accorded by the external connection. In some examples, the connector input 110 is configured to receive a USB-C connector, Thunderbolt connector, mini-USB connector, micro-USB connector, headphone jack, and/or connectors proprietary to the electronic device 100 or external attachment. Other suitable types of connectors for receipt or engagement with the connector input 110 will be understood by those of skill in the art from the description herein.

Figure 2:
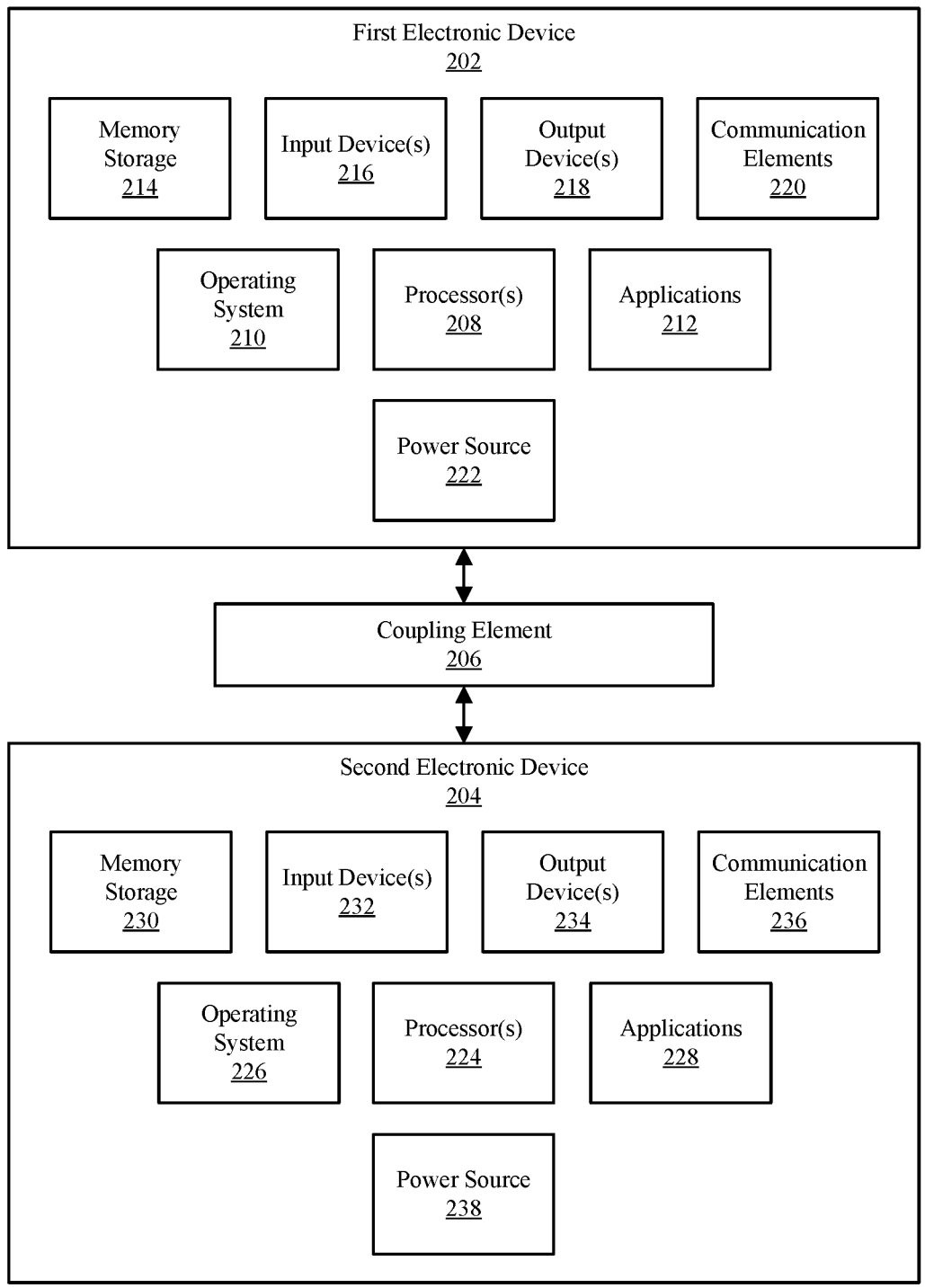
FIG. 2 is a diagram of a system with electronic devices and a coupling element.

FIG. 2 is a diagram of an electronic computer system 200 in accordance with examples of the invention. The electronic computer system 200 includes a first electronic device 202, a second electronic device 204, and a coupling element 206 linked between or connected to the first electronic device 202 and the second electronic device. In the example system 200, the first electronic device 202 and the second electronic device 204 include various computing components and software which can contribute to the computing resources of the first electronic device 202 and the second electronic device 204, although additional/alternative computing components that contribute to computing resources are further described herein. The first electronic device 202 can include one or more processors 208, an operating system 210, applications (e.g., software applications) 212, memory storage 214, one or more input devices 216, one or more output devices 218, communication elements 220, and a power source 222. The second electronic device 204 can include one or more processors 224, an operating system 226, applications (e.g., software applications) 228, memory storage 230, one or more input devices 232, one or more output devices 234, communication elements 236, and a power source 238.

The one or more processors 208/224 can also be referred to and/or as including control circuitry, a main processor, an applications processor, power management unit, etc. The one or more processors 208/224 can be used to execute instructions (e.g., computer code) stored on the memory storage 214/230. The one or more processors 208 can control operation of the first electronic device 202 and access storage such as memory storage 214, and the one or more processors 224 can control operation of the second electronic device 204 and access storage such as memory storage 230. The processors 208/224 can also perform power management operations for optimizing power consumption of the electronic devices. The memory storage 214/230 can include non-volatile memory (e.g., flash memory or other electrically-programmable-read-only memory forming a solid state drive), volatile memory (e.g., static or dynamic random access memory (SRAM/DRAM)), or any other type of electronic storage medium.

Generally, the one or more processors 208 are utilized to run/operate software, such as the operating system 210 and applications 212, on the first electronic device 202, and the one or more processors 224 are utilized to run/operate software, such as the operating system 226 and applications 228, on the second electronic device 204. Operating systems 210/226 of the electronic devices 202/204 can include system software suitable (or necessary) for the basic or core operations, such as display interface, file system management, connectivity, accessory operation, etc. Applications 212/228 can include internet browsing applications, voice-over-internet-protocol (VOIP) telephone call applications, email applications, media playback applications, operating system functions, etc. The one or more processors 208 are communicatively coupled to various components of the first electronic device 202, such as the memory storage 214, one or more input devices 216, one or more output devices 218, communication elements 220, and the power source 222, etc. The one or more processors 224 are communicatively coupled to various components of the second electronic device 204, such as the memory storage 230, one or more input devices 232, one or more output devices 234, communication elements 236, and the power source 238, etc.

The first electronic device 202 also includes one or more input devices 216 and one or more output devices 218, and the second electronic device 204 includes one or more input devices 232 and one or more output devices 234. The input devices 216/232 and output devices 218/234 can be generally configured for accepting and inputting data (e.g., from a user, an accessory attachment, etc.) and for outputting/transmitting data (e.g., from the device, an accessory attachment, etc.), respectively. Input devices 216/232 and output devices 218/234 can include touch screens, displays with or without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, haptic sensors/feedback providers, etc.

As described above, the first electronic device 202 includes communication elements 220 and the second electronic device 204 includes communication elements 236. The communication elements 220/236 can include wireless communications circuitry, such as radio-frequency (RF) transceiver circuitry formed from one or more integrated circuits, power amplifier circuitry, low-noise input amplifiers, passive RF components, one or more antennas, transmission lines, optical transmission, and other circuitry for handling RF wireless signals, etc. The communication elements 220/236 can also include satellite navigation system circuitry such as a global positioning system (GPS). The communication elements 220/236 can be compatible with Wi-Fi, Bluetooth, NFC (near-field communication), and other wireless communication protocols.

The first electronic device 202 includes a power source 222 and the second electronic device 204 includes a power source 238. The power source 222/238 can include one or more batteries suitable for portable operation of the electronic devices 202/204. The power source 222/238 can alternatively be provided externally, such as by attaching an external battery attachment or cable to a non-portable power supply.

As shown in FIG. 2, a coupling element 206 is communicatively linked to the first electronic device 202 and the second electronic device 204. The coupling element 206 can also be physically secured to both the first electronic device 202 and the second electronic device 204, effectively coupling, attaching or securing the first electronic device 202 to the second electronic device 204 via the coupling element 206. As the coupling element 206 is communicatively linked to the electronic devices 202/204, when coupled to both the first electronic device 202 and the second electronic device 204, a communication link can be established between the first electronic device 202 and the second electronic device 204 via a flexible connector or cable included in the coupling element 206. The link facilitates the transfer of power and/or data between the electronic devices via the coupling element 206. Thus, the computing resources of the electronic devices, such as the resources provided by the processors 208/224, OS(s) 210/226, applications 212/228, memory 214/230, communication elements 220/236, power sources 222/238, etc., can be shared (e.g., accessed) between the devices 202 and 204 through the coupling element 206, as is described in further detail below.

Referring next to FIG. 3, a diagram of a system 300 including multiple electronic devices is shown. The system 300 includes a first electronic device 302 and a second electronic device 304. The first electronic device 302 is shown as a tablet computer in a portrait orientation and the second electronic device 304 is shown as a tablet computer in a landscape orientation, however this is exemplary and not exclusive, as other suitable orientations and types of electronic devices will be understood by those of skill in the art from the description herein.

The first electronic device 302 includes a display screen 306, a representative input 308 and output 310, as well as computing resources 312 dedicated to or attributed to the operation of the first electronic device 302. The second electronic device 304 also includes a display screen 314, a representative input 316 and output 318, as well as computing resources 320 dedicated to or attributed to the operation of the second electronic device 302. Although the computing resources 312/320 are shown to be bundled/combined into a singular reference object, the computing resources 312/320 can include resources such as those from the inputs, outputs, display screens, and/or other components.

In exemplary systems, such as system 300, the electronic devices can implement varying operational capabilities. In the example shown, the second electronic device 304 has better operational capabilities than the first electronic device 302. The second electronic device 304 can be a fully functional computing device, operating with attachments such as an external keyboard 322, external mouse/trackpad 324, external stylus or digital pen/pencil 326, and other external input devices (not shown). In contrast, the first electronic device 302 can be a tablet computer with simple operational capabilities, such as limited to digital paper or a dedicated video capture/playback device. While the first electronic device 302 and the second electronic device 304 are operationally independent of each other, the difference in operational capabilities can indicate, for example, that the computing resources 320 of the second electronic device 304 are greater than the computing resources 312 of the first electronic device 302. In additional embodiments, the computing resources of the devices can be equivalent or opposite in proportionality to those shown in system 300.

It may be desired to couple the first electronic device 302 with the second electronic device 304 so that the devices operate in conjunction together in a coupled or attached configuration. Furthermore, it may be desired to share computing resources between the devices when coupled to increase and/or maximize operational capabilities of the coupled devices. Also, the computing resources of one device can be augmented by the computing resources of another device when coupled. For example, even though the computing resources 312 of the first electronic device 302 are less than the computing resources 320 of the second electronic device 304, the first electronic device 302 may require even less computing resources to operate in the coupled configuration, thereby enabling unused computing resources from the computing resources 312 to be made available to the second electronic device 304, augmenting the computing resources 320 of the second electronic device 304.

In some embodiments, the computing resources associated with power consumption (e.g., battery life) can be shared and/or optimized between the first electronic device 302 and the second electronic device 304, in the coupled configuration. For example, when coupled, the power consumption of the electronic devices can change as opposed to operation when separate (e.g., the second electronic device 304 requiring more power than the first electronic device 302). Accordingly, when coupled, the devices can be configured to determine an amount of available power that should be transferred and/or accessed between the two electronic devices in order to maximize remaining battery life. Such determinations can include determining, when coupled, which of the first electronic device 302 or the second electronic device 304 is the "host" device (e.g., the device that will utilize or require more CR) and then optimizing power consumption and exchange between devices accordingly.

Additionally, the electronic devices 302/304 can also include various operational modes designated for coupled configurations. For example, in response to detecting a coupling of the electronic devices, the first electronic device 302 can switch to an operational mode so the device operates as a dedicated, primary display for the coupled system, while the second electronic device 304 can switch to an operational mode so the device operates as the primary computing portion of the system. These operational modes may advantageously optimize distribution of computing resources between multiple electronic devices to maximize computing capabilities or achieve a desired/specific functionality, when coupled.

Figure 4A:
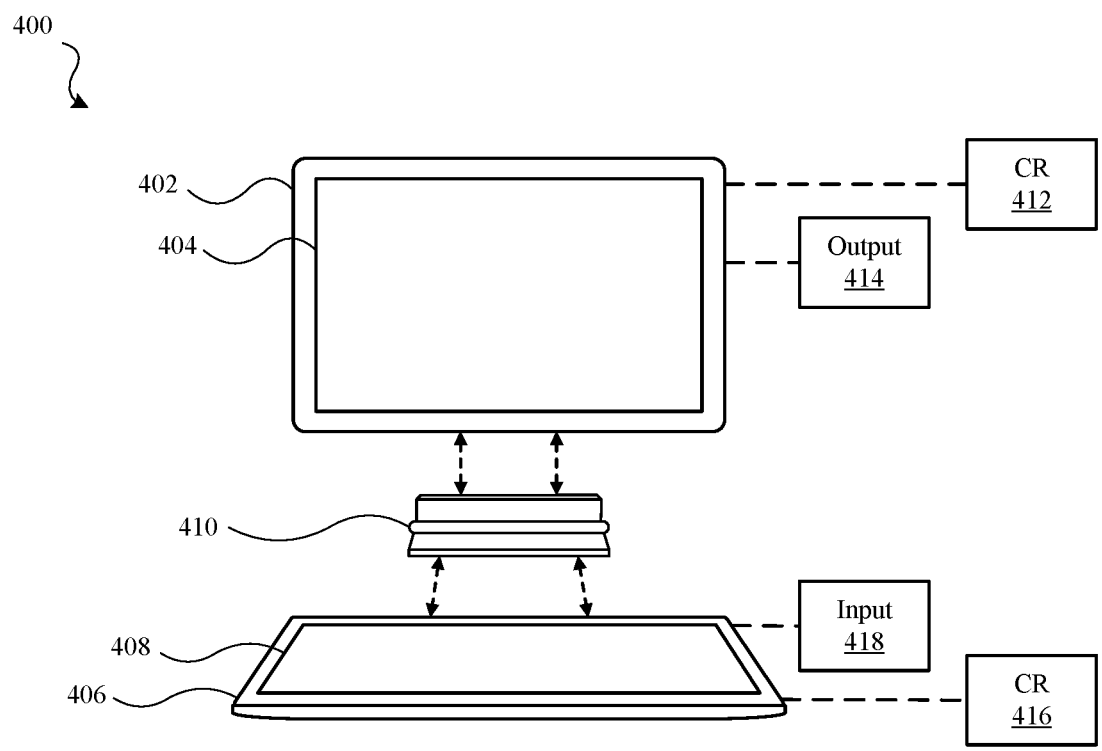
FIGS. 4A and 4B are diagrams showing multiple electronic devices in a coupled configuration.
Figure 4B:
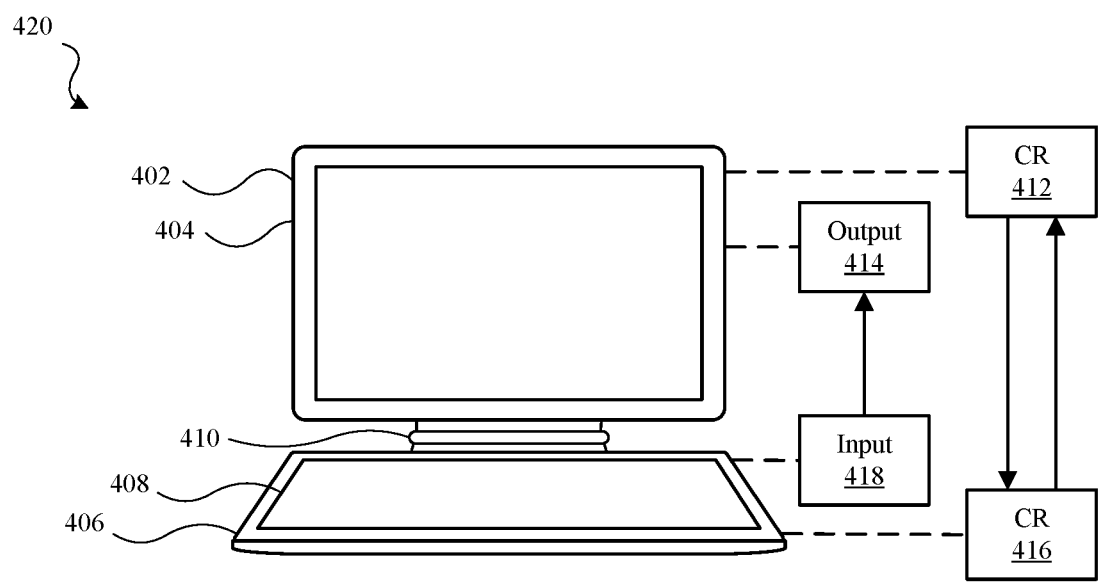

An example of a coupled system sharing computing resources is shown in FIGS. 4A and 4B. The system in the uncoupled configuration 400 includes a first electronic device 402 having a first display 404, a second electronic device 406 having a second display 408, and a coupling element 410 positioned between the first electronic device 402 and the second electronic device 406. The first electronic device 402 includes computing resources 412 and an output mechanism 414, while the second electronic device 406 includes computing resources 416 and an input mechanism 418.

In the coupled configuration 420 shown in FIG. 4B, the first electronic device 402 and the second electronic device 406 are coupled via the coupling element 410. In some embodiments of the coupled configuration 420, the computing resources 412 of the first electronic device 402 and the computing resources 416 of the second electronic device 406 are shared as shown in FIG. 4B. As an example, the computing resources 416 associated with or dedicated to power consumption can be optimized between the first electronic device 402 and second electronic device 406, and the coupling element 410 is configured to facilitate power sharing between the electronic devices. In some embodiments, the remaining battery life in the electronic devices is used to optimize the power consumption in the coupled configuration 420, and power is transferred accordingly to maximize the effective remaining battery life of both electronic devices while operating in the coupled configuration 420. One or both of the electronic devices can be adapted to receive charge (e.g., wired connection through a charging input, an additional connection in the coupling element 410, inductive charging via a charging pad, etc.) and the received charge, along with the remaining battery life of both the first electronic device 402 and the second electronic device 406 can be utilized/distributed accordingly to maximize operation and charging of the devices during operation. As an example, the power distribution between the electronic devices can be optimized such that the first electronic device 402 and second electronic device 406 have an equivalent remaining battery life upon separation from the coupled configuration 420, or other desired criteria.

Furthermore, the coupled configuration 420 also links operations of various components of the electronic devices such that they operate in conjunction. For example, as shown in FIG. 4B, the input 418 of the second electronic device 406 is linked with the output 414 of the first electronic device 402 as one-way communication (although it is contemplated that two-way communication may be desired in some embodiments, one-way is shown as exemplary for purposes of this embodiment). Thus, when coupled, the second electronic device 406 can be configured to operate as an input mechanism via input 418 (e.g., a digital keyboard displayed on the display 408 of the second electronic device 406, where the display 408 includes touch-sensitive operations for receipt of input 418) and the first electronic device 402 utilizes the output 414 to display the input 418 received from the second electronic device 406 via display screen 404. Other suitable input/output operational relationships between electronic devices in coupled configurations are further described below and will be understood by one of skill in the art from the disclosure herein.

Turning next to FIGS. 5, 6, 7A, 7B, and 7C, various coupling elements and coupling element operations are shown and will be described. The coupling elements can be adapted to be secured to a first electronic device and a second electronic device at multiple locations/parts/portions of the coupling elements, while providing/establishing a communication path/link between the electronic devices.

At FIG. 5, an example of a coupling element 500 is shown. The coupling element 500 includes a body element 502. The body element 502 (and by extension the coupling element 500) can include at least a first part or portion or end 504, a second part or portion or end 506, and a joining element 508 positioned between the first part 504 and second part 506. The joining element 508 is configured to affix the first part 504 and the second part 506 together (thereby mechanically coupling a first device to a second device). As shown, the joining element 508 can be a cylindrical hinge component that facilitates rotation of the first part 504 with respect to the second part 506. As such, the coupling element 500 is depicted at an angled position. In other embodiments, the joining element 508 can be a non-rotating shaft and/or other additional element for joining/affixing/bridging the first part 504 and the second part 506. In some embodiments, a joining element 508 can be omitted such that the first part 504 and the second part 506 are directly connected to each other.

The coupling element 500 also includes a first connector 510 positioned on and extending/protruding from the first part 504 of the body element 502, and a second connector 512 positioned on and extending/protruding from the second part 506 of the body element 502. The connectors 510 and 512 are adapted to engage with communication ports or connector inputs on electronic devices (such as connector input 110 of device 100 in FIGS. 1A and 1B). Thus, the connectors 510 and 512 can include male USB-C connector, Thunderbolt connector, mini-USB connector, micro-USB connector, headphone jack, and/or connectors proprietary to the electronic device 100 or external attachment, as well as any other suitable types of connectors for receipt or engagement with the connector input of electronic devices as will be understood by those of skill in the art from the description herein. In other embodiments, the connectors 510/512 can be female connectors adapted to receive and engage with male connectors extending from electronic devices sought to be coupled to the coupling element 500.

Securing elements are included in the coupling element 500 that are adapted to facilitate secure coupling of electronic devices to the coupling element 500. As the connectors 510 and 512 are adapted to engage with ports on devices in some embodiments, the connectors 510 and 512 additionally act as securing elements because engagement of the connectors 510/512 with ports on electronic devices can provide suitable mechanical coupling for securing the devices.

The coupling element 500 can also include magnetic components as securing elements. For example, the body element 502 can include one or more magnetic elements 514 embedded within (or externally attached to) the first part 504, and one or more magnetic elements 516 embedded within (or externally attached to) the second part 506. Types of magnetic materials utilized as magnets or magnetic elements in the coupling elements and electronic devices disclosed herein include rare earth metals, such as Samarium-cobalt, Neodymium, Lanthanide-based, etc., ferromagnetic or ferromagnetic materials (e.g., iron-based), paramagnetic substances (e.g., platinum, aluminum, oxygen, etc.), diamagnetic materials, superconductors, etc. Other suitable types of materials for use as magnets, magnetic elements, etc., will be understood by those of skill in the art from the description herein.

As the first part 504 of the coupling element 500 couples with a first electronic device, the magnetic elements 514 are configured to form a magnetic circuit with magnets in the first electronic device, thereby magnetically securing the first electronic device with the first part 504 of the body element 502. Congruently, as the second part 506 couples with a second electronic device, the magnetic elements 516 are configured to form a magnetic circuit with magnets in the second electronic device, thereby magnetically securing the second electronic device with the second part 506 of the body element 502. Thus, the connectors and magnetic elements of the coupling element 500 can be used individually or in combination as securing features that enable or facilitate attachment/coupling of electronic devices to various portions of the body element 502 of the coupling element 500.

Referring next to FIG. 6, a top view, partially transparent diagram of a coupling element 600, which is similar to coupling element 500, is shown. The coupling element 600 includes a body element 602 having a first part 604, a second part 606, and a joining element 608 joining the first part 604 and the second part 606. The coupling element 600 can also include a first connector 610 on the first part 604 and a second connector 612 on the second part 606. As with coupling element 500 of FIG. 5, the first part 604 can include magnetic elements 616 to magnetically secure an electronic device to the first part 604 of the body element 602 and the second part 606 can include magnetic elements 618 to magnetically secure an electronic device to the second part 606 of the body element 602.

Through the coupling element 600, a communication link/path 614 is provided between the first connector 610 and the second connector 612. The communication link/path 614 provides a path for communication, as well as data and power transfer, between a first electronic device coupled to the first connector 610 and a second electronic device coupled to the second connector 612, which facilitates operational communications as well as computing resource exchange between the electronic devices when coupled to the coupling element 600. The communication link/path 614 can be embedded within the coupling element 600 and/or run external to the coupling element 600. In some embodiments, the communication link/path 614 includes, at least in part, a wireless path established between the electronic devices. The wireless path can be established based on data transferred between the first connector 610 and the second connector 612. In some embodiments, the communication link/path 614 is an electrical cable or wire connecting the first connector 610 to the second connector 612. In addition, the coupling element 600 can also include an additional connector 620 adapted to receive a charging cable connection (e.g., USB-C or other power transfer cable) for transfer of power to either electronic device attached to the coupling element 600. The connector 620 can also facilitate data transfer to or from devices coupled to the coupling element 600.

Next, in FIGS. 7A, 7B, and 7C, side cross-sectional views of coupling elements in various rotational positions are shown. A communication link/path running between connectors in the coupling elements is flexible (e.g., a flexible circuit, a wire/cable with sufficient slack, etc.) such that the link/path can conform to orientations/positions of the coupling elements or electronic devices and can facilitate data and power transfer between the electronic devices.

In FIG. 7A, a coupling element 700 is shown in an upright position, such that the first part 702 and the second part 704 are vertical with respect to each other (e.g., in a 180 degree rotational separation). In the coupling element 700, the joining element is a rotational hinge component 706. The first connector 708 is positioned at an end of the first part 702 and the second connector 710 is positioned at an end of the second part 704. The communication path/link 712 is disposed or embedded within the coupling element 700, such that the path/link 712 runs from the first connector 708, through the first part 702, through the hinge component 706, and through the second part 704 to the second connector 710.

The communication path/link 712 can also include a flexible or angled portion 714 positioned where the link 712 is embedded at the hinge component 706, such that the communication path/link 712 is allowed to flex/bend/conform with the movement, orientation, and rotation of the coupling element 700. Thus, as shown in the orientation 716 in FIG. 7B, the first part 702 is rotated toward the second part 704, and the communication link 712 flexes at the flexible portion 714 to maintain connection between the first connector 708 and the second connector 710. Similarly, in the orientation 718 at FIG. 7C, the second part 704 of the coupling element 700 is rotated toward the first part 702, and the communication link 712 flexes at the flexible portion 714 to maintain connection between the first connector 708 and the second connector 710. Although FIGS. 7A-7C depict the communication link 712 as a connection with a flexible portion 714, other suitable communication links will be understood from the disclosure herein. For example, the communication link can be entirely flexible instead of having a flexible portion, or the communication link can have sufficient slack to maintain connection through rotation.

Figure 8:
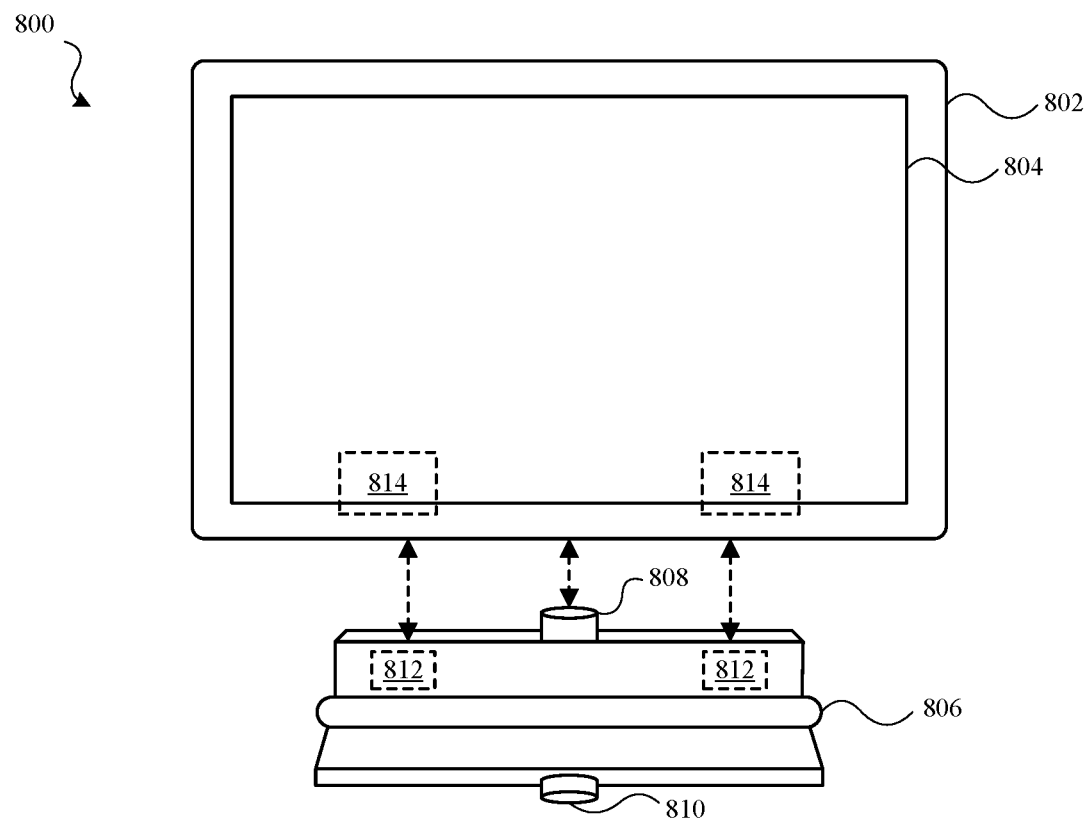
FIG. 8 is a front view of an electronic device and a coupling element aligned for coupling.
Figure 9:
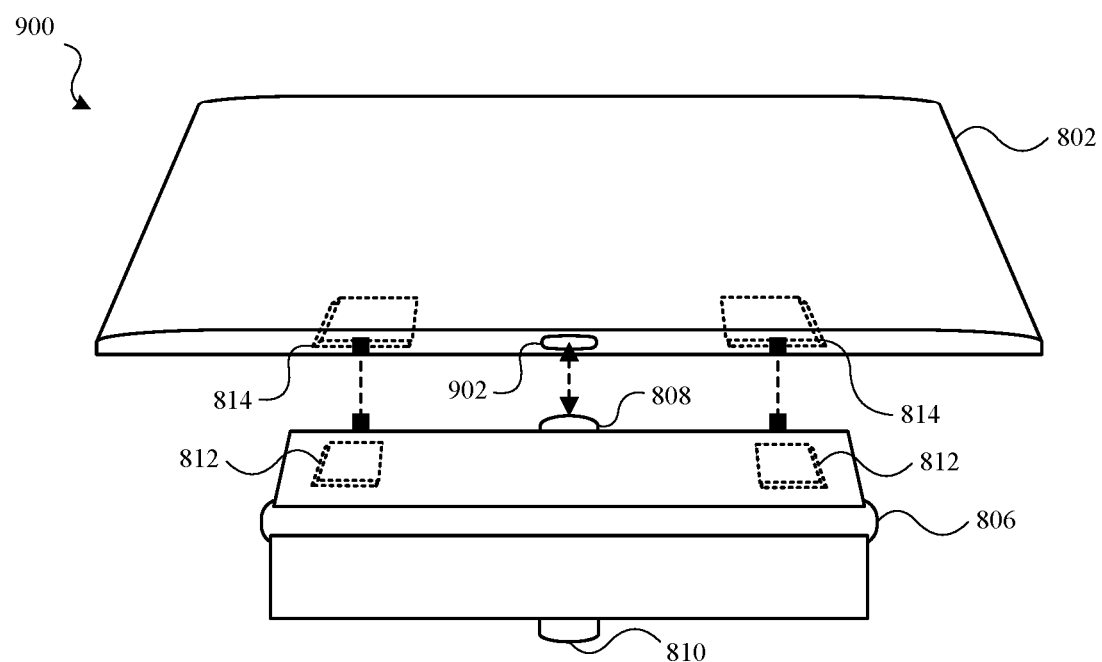
FIG. 9 is a rear view of an electronic device and a coupling element aligned for coupling.

An example of coupling a single electronic device to a coupling element is shown in FIGS. 8 and 9, with FIG. 8 being a front view 800 and FIG. 9 being a rear view 900. As depicted, an electronic device 802 includes a display 804, and a coupling element 806 includes a first connector 808 for coupling with the electronic device 802 as well as a second connector 810 for coupling with another device (not depicted). Coupling the electronic device 802 to the coupling element 806 utilizes alignment of securing features on both the electronic device 802 and the coupling element 806. For example, the first connector 808 (e.g., a mechanical securing feature) is aligned with a connector input 902 positioned on a bottom side of the electronic device 802. Furthermore, the magnetic elements 812 (e.g., magnetic securing features) in the coupling element 806 are aligned with magnets 814 of the electronic device 802 such that magnetic circuits can be sufficiently formed between the magnetic elements 812 and the magnets 814 to magnetically secure the electronic device 802 to the coupling element 806.

Figure 10:
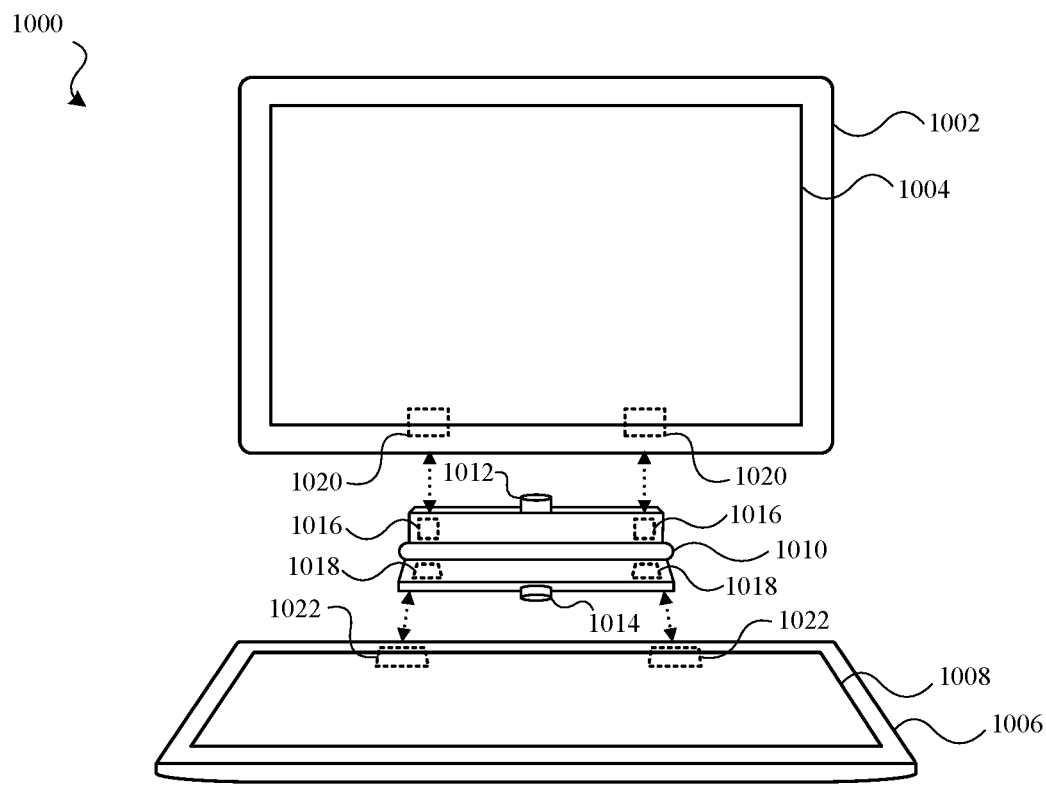
FIG. 10 is a front view of electronic devices and a coupling element aligned for coupling.
Figure 11:
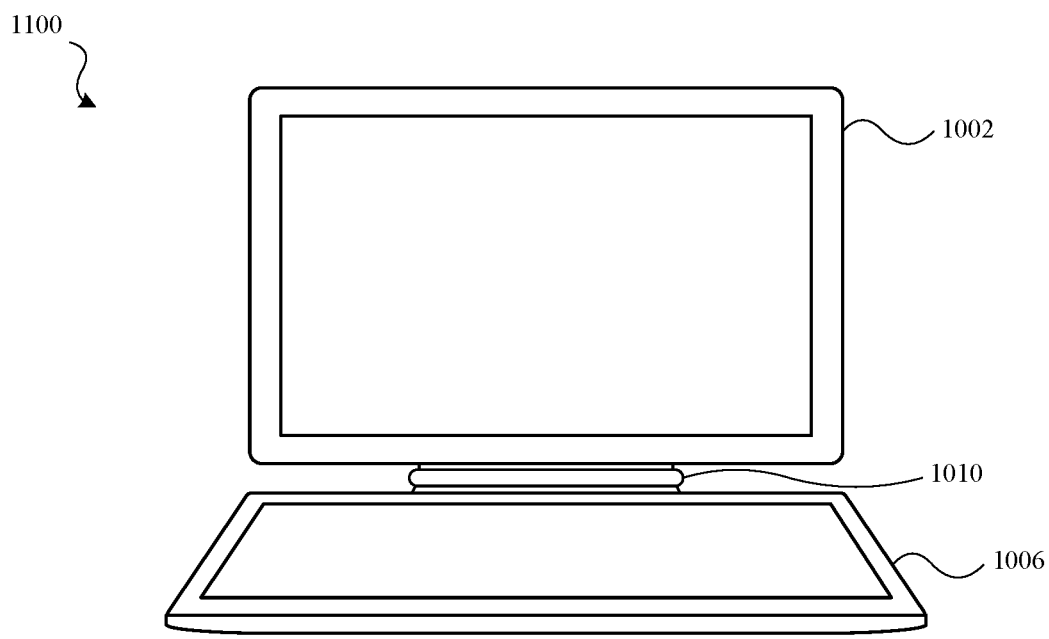
FIG. 11 is a front view of electronic devices in a coupled configuration.

A further example of coupling multiple electronic devices to a coupling element are shown in FIGS. 10 and 11, with FIG. 10 showing an expanded system 1000 and FIG. 11 showing the connected system 1100. The systems 1000 and 1100 include a first electronic device 1002 having a first display 1004 and a second electronic device 1006 having a second display 1008. A coupling element 1010 is positioned between the first electronic device 1002 and second electronic device 1006. The coupling element 1010 includes a first connector 1012 configured to engage a connector input (not shown) on the first electronic device 1002, as well as a second connector 1014 configured to engage a connector input (not shown) on the second electronic device 1006. The connectors 1012 and 1014 are aligned with the connector inputs of the first electronic device 1002 and second electronic device 1006, respectively, as described at FIGS. 8 and 9.

The coupling element 1010 includes magnetic elements 1016 and magnetic elements 1018. The magnetic elements 1016 are configured to be aligned with the placement of magnets 1020 on the first electronic device 1002 such that, when the coupling element 1010 is placed in proximity of the first electronic device 1002 and the connector 1012 is engaged with the connector input of the first electronic device 1002, the magnetic elements 1016 form magnetic circuits with the magnets 1020 of the first electronic device 1002, thereby magnetically securing the first electronic device 1002 to the coupling element 1010. Similarly, the magnetic elements 1018 are configured to be aligned with the placement of magnets 1022 on the second electronic device 1006 such that, when the coupling element 1010 is placed in proximity of the second electronic device 1006 and the connector 1014 is engaged with the connector input of the second electronic device 1006, the magnetic elements 1018 form magnetic circuits with the magnets 1022 of the second electronic device 1006, thereby magnetically securing the second electronic device 1006 to the coupling element 1010.

In some embodiments, any of the magnetic elements described above (or an additional magnetic element in the devices and/or coupling elements) can be implemented as an electro-permanent magnet (EPM) and/or other type of triggering element that, when triggered, actuates or initiates a coupled configuration mode of the devices. For example, when a device is connected to the coupling element, the EPM can be triggered indicating that the devices are to engage in a coupling configuration mode (e.g., a computing resource sharing mode). The triggering elements or EPMs can be positioned in each of the devices as well as the coupling element, such that multiple elements are to be triggered prior to initiating the coupled configuration mode. Additionally, the coupling element can provide a communication path through the coupling element via a wired connection, and the electronic devices can be further configured to establish a wireless communication path. The wireless communication path is available for use simultaneously with the wired path for sharing of the computing resources. In some embodiments, the wireless communication path is opened in response to detection of the triggering element in the coupling element by one or both of the electronic devices. In some embodiments, a wired connection is used for sharing computing resources. In some embodiments, a wireless connection is used for sharing computing resources.

Figure 12A:
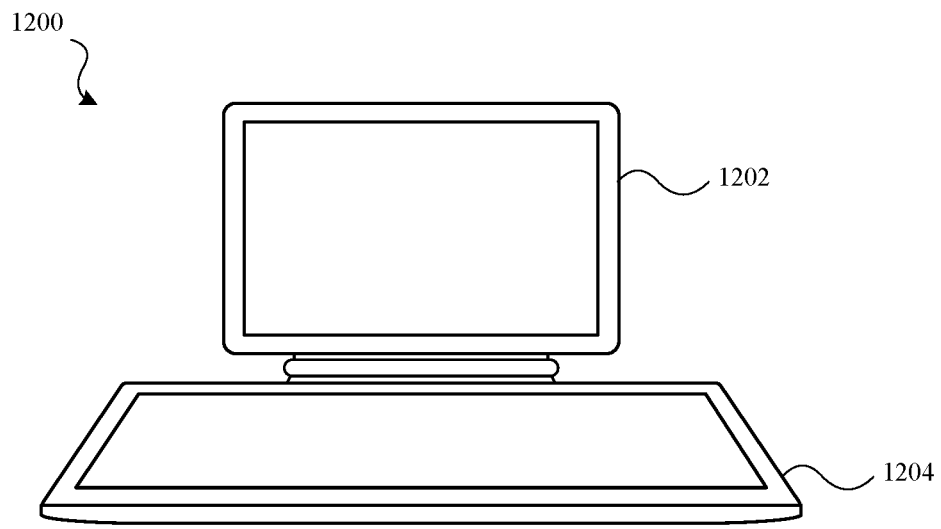
FIGS. 12A and 12B are views of electronic devices of various sizes and orientations in coupled configurations.
Figure 12B:
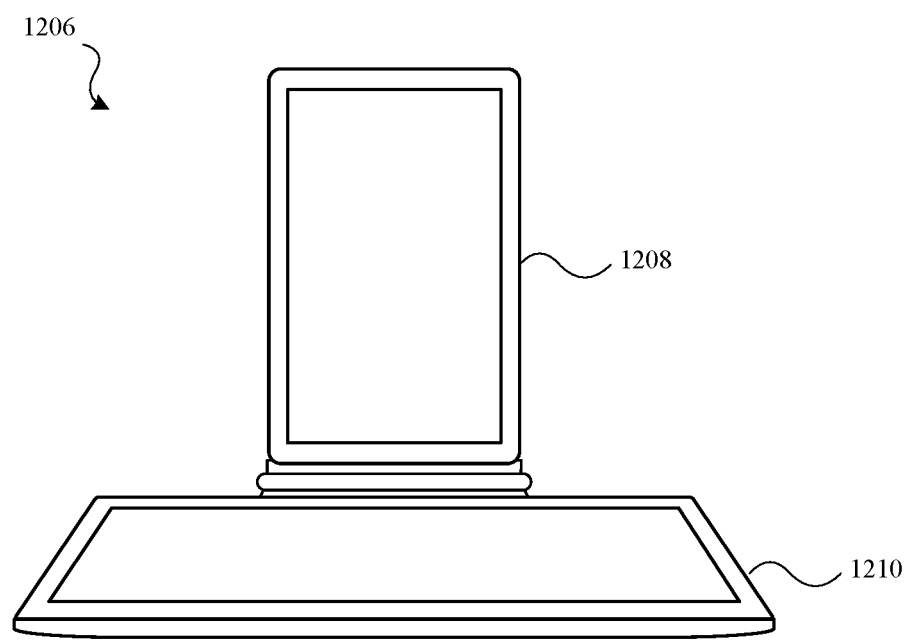

It is contemplated that multiple configurations may be utilized as shown in FIGS. 12A and 12B. For example, the configuration 1200 in FIG. 12A shows the first electronic device 1202 being smaller than the second electronic device 1204. Similarly, in configuration 1206 of FIG. 12B, the first electronic device 1208 is in a different orientation than the second electronic device 1210. Many other configurations may be utilized, including phones, mini-tablets, and other tablet devices of various sizes and weights. Accordingly, weight distribution is addressed via coupling elements and other mechanisms. For example, in embodiments where magnetic connection is used to facilitate connection (e.g., at FIG. 10), the strength of the magnetic coupling is adapted accordingly such that the devices in the coupled configuration can remain upright or in various angled positions without inadvertently detaching.

Figure 13A:
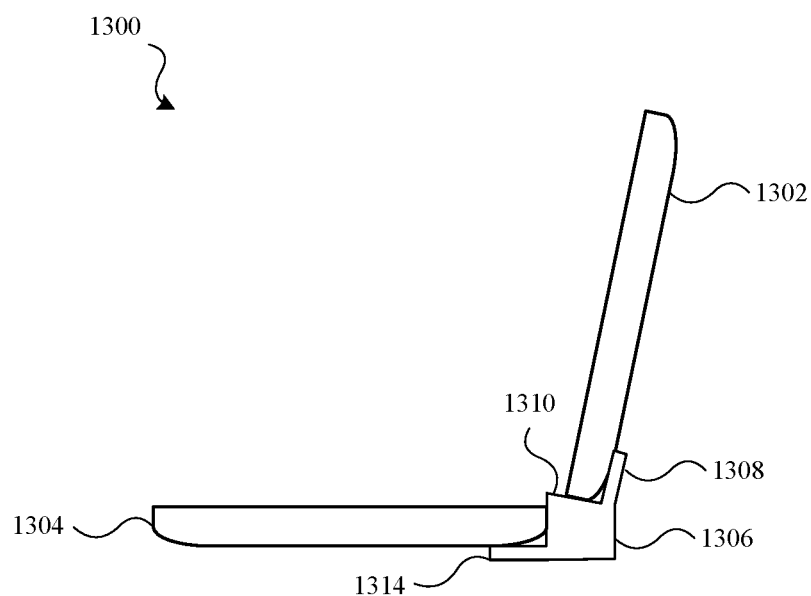
FIGS. 13A and 13B depict electronic devices in a coupled configuration, and a coupling element having lip portions and engagement surfaces.
Figure 13B:
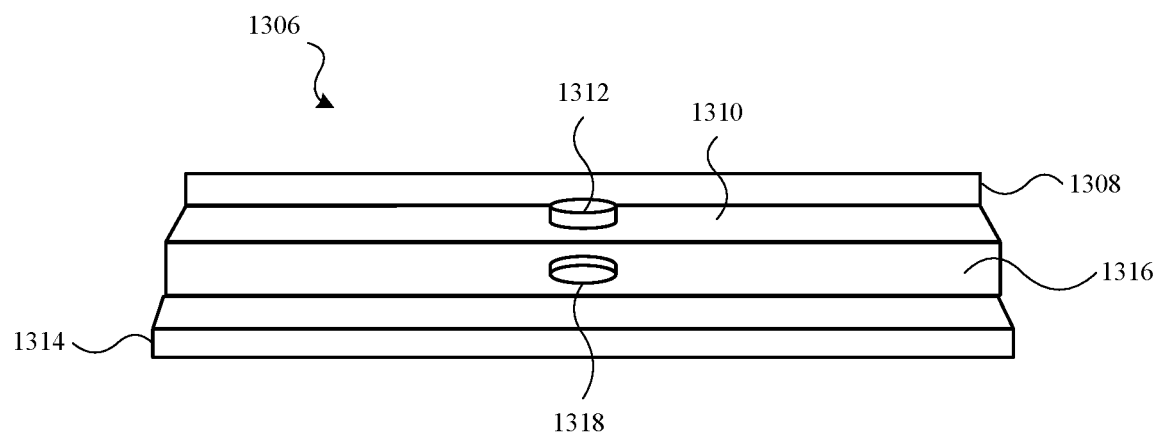
Figure 15A:
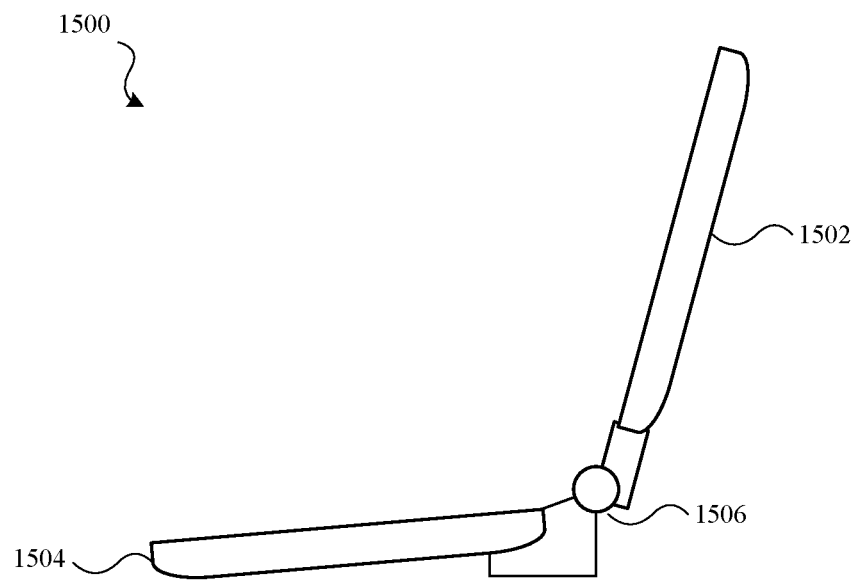
FIGS. 15A and 15B depict electronic devices in a coupled configuration and a coupling element having an elevated engagement surface.
Figure 15B:
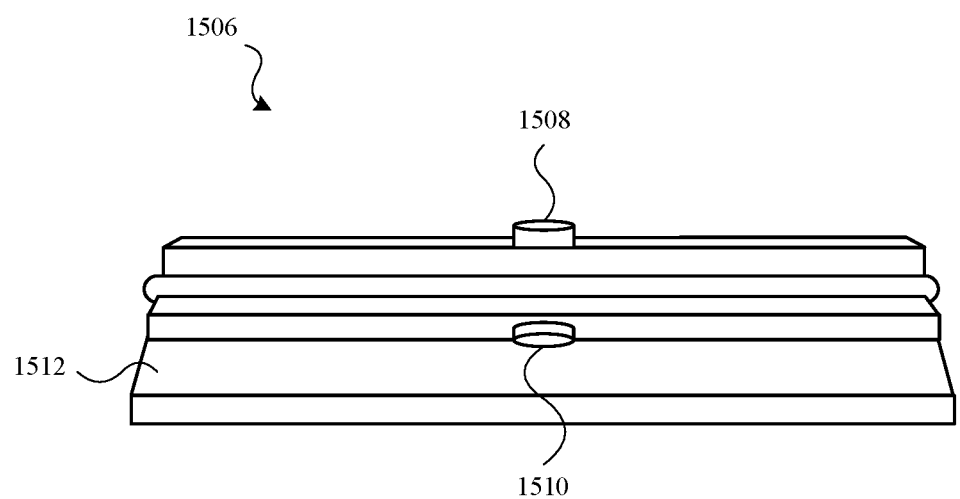

FIGS. 13A and 13B depict an additional configuration and coupling element adapted to address weight distributions and provide better support for the electronic devices attached thereto. The configuration 1300 shows a first electronic device 1302, a second electronic device 1304, and a coupling element 1306. In the example depicted, the coupling element 1306 is fixed (e.g., non-rotating); however, the features depicted can also be utilized in rotating coupling elements such as those disclosed herein. FIG. 13B depicts the coupling element 1306 apart from the electronic devices 1302 and 1304. The coupling element 1306 includes a top lip portion 1308, a top engagement surface 1310 and top connector 1312, as well as a bottom lip portion 1314, a bottom engagement surface 1316, and a bottom connector 1318.

The top lip portion 1308 can be oriented at an angle parallel to the top connector 1312 to guide attachment of the first electronic device 1302 to the coupling element 1306. The bottom lip portion 1314 can be oriented at an angle parallel to the bottom connector 1318 to guide attachment of the second electronic device 1304 to the coupling element 1306. When coupled in the configuration 1300, the first electronic device 1302 rests on the top engagement surface 1310 and against the top lip portion 1308, and the second electronic device 1304 is positioned against the bottom engagement surface 1316 and rests on the bottom lip portion 1314. The top lip portion 1308 and top engagement surface 1310 can be oriented at an angle greater than 90 degrees (or perpendicular) with respect to the bottom lip portion 1314, such that the first electronic device 1302 is presented at an angle of greater than 90 degrees (or perpendicular) with respect to the second electronic device 1304. This orientation also provides additional support to the first electronic device 1302 while in the configuration 1300 in that a rear surface of the first electronic device 1302 rests against the top lip portion 1308 of the coupling element 1306.

As described above, magnets, lips, angles, and other structures/elements can be utilized to strengthen and/or support the weight of the connected devices in coupled configurations. It may also be desired to configure magnetic strength and/or coupling element structure(s) such that one of the devices can be uncoupled from the coupling element without altering, or minimally altering, the position of the other coupled electronic device. For example, the coupling element 1306 above can be biased or weighted down such that the first electronic device 1302 can be lifted and removed from the top engagement surface 1310 and top connector 1312 without altering, or minimally altering, the position or orientation of the second electronic device 1304.

FIGS. 14A, 14B, 14C, and 14D show an electronic system with coupled electronic device(s) in various orientations and positions. The electronic system includes a first electronic device 1400, a second electronic device 1402, and a coupling element 1404 that holds the first electronic device 1400 and the second electronic device 1402 in a coupled configuration. FIG. 14A shows a front view, FIG. 14B shows a side view, and FIG. 14C shows a rear view. In FIG. 14D, the coupling element 1404 can be configured to attach to the electronic devices 1400 and 1402 such that, when in the coupled configuration, the first electronic device 1400 can be rotated (e.g., folded) toward the second electronic device 1402, thereby contacting the second electronic device 1402 and/or forming a closed, clam-shell like position. Such a position can be associated with an "off", "stand-by", "hibernation", or "shut-down" operational mode, and such an operational mode in either or both of the first electronic device 1400 and second electronic device 1402 can be triggered in response to detecting such rotation of the coupling element 1404 or relative position of the first electronic device 1400 to the second electronic device 1402. In some embodiments, cameras positioned on the electronic devices 1400/1402 and can be used to detect the proximity of one device to the other in order to trigger or initiate the desired operational mode of the devices. The coupling element 1404 can support additional orientations, such as greater that 90 degrees, 180 degrees (where the display of the electronic devices both face upward with respect to a resting surface), and greater than 180 degrees. Accelerometers (or other mechanisms) in the devices 1400/1402 and/or the coupling element 1404 such that a desired orientation or operational mode of the devices can be triggered by changes in respective angles.

Additional configurations may be desirable. For example, at FIGS. 15A and 15B, an ergonomic configuration 1500 along with the coupling element 1506 is shown. The configuration 1500 includes a first electronic device 1502, a second electronic device 1504, and the coupling element 1506. The coupling element 1506 includes a top connector 1508 and a bottom connector 1510, along with a bottom engagement surface 1512 for engagement with the second electronic device 1504. The bottom engagement surface 1512 is inclined at an angle with respect to a resting surface such that the second electronic device 1504 is elevated at an inclined angle when engaged with the bottom engagement surface 1512. As the second electronic device 1504 can be used as an input device (e.g., a multi-touch keyboard) when in the configuration 1500, the elevated position of the second electronic device 1504 may be preferred ergonomically.

Figure 16:
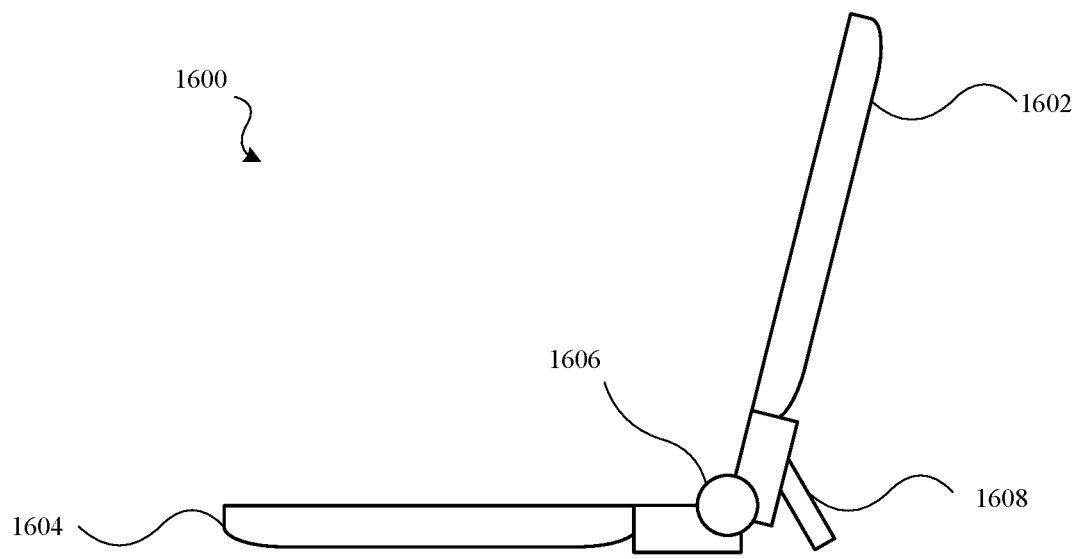
FIG. 16 is a side view of electronic devices in a coupled configuration with a coupling element having a kick stand.

Another example configuration 1600 is shown at FIG. 16. The configuration 1600 includes a first electronic device 1602, a second electronic device 1604, and a coupling element 1606. To support the weight of the first electronic device 1602 when coupled to the coupling element 1606 (and for overall balance of the configuration as a whole), a kick stand 1608 is included in the coupling element 1606. The kick stand 1608 can be retractable and can be configured in multiple positions to which it can extend from the coupling element 1606.

Although various coupling elements are depicted and disclosed herein, each embodiment is exemplary and not exclusive. A coupling element as disclosed herein can utilize triggering magnets or EPMs, can be rotatable via a hinge, can include lip portions and angled engagement surfaces, can include kick stands, and/or any combinations thereof.

Figure 17:
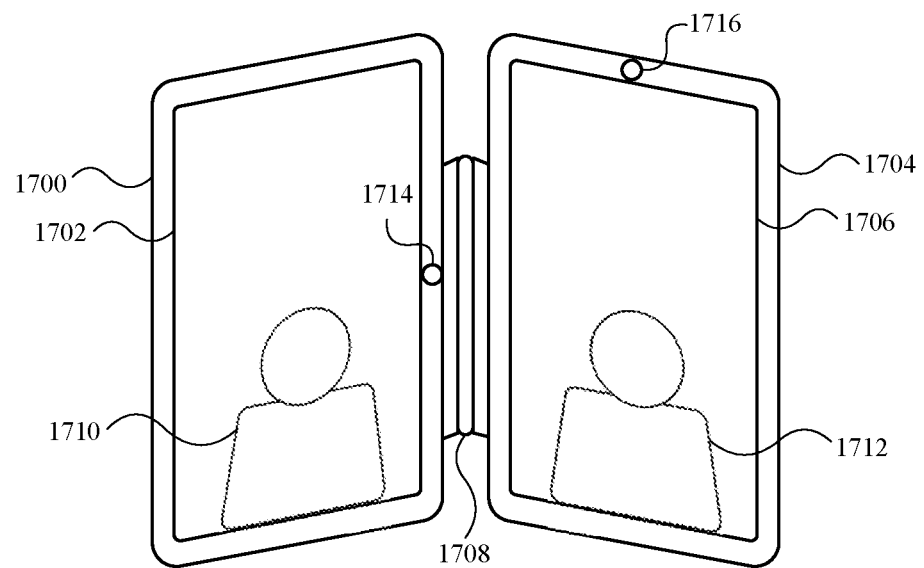
FIG. 17 is a front view of electronic devices in a coupled configuration and in a vertical, book-like orientation.

A further orientation and configuration is shown in FIG. 17. In FIG. 17, a first electronic device 1700 having a first display 1702 and a second electronic device 1704 having a second display 1706 are in a coupled configuration and are coupled via the coupling element 1708. The first electronic device 1700 and second electronic device 1704 are oriented in a vertical, open-book like position. A first person or object 1710 is shown on the first display 1702 and a second person or object 1712 is shown on the second display 1706. In some examples, the persons shown on the displays are engaged with a multi-user video call operation. Cameras, such as the camera 1714 located on the long edge of the first electronic device 1700 and/or the camera 1716 located on the short edge of the second electronic device 1704, can be utilized in this operation, as the first camera 1714 can operate to capture and transmit video data/information to the first user 1710 individually, while the second camera 1716 can operate to capture and transmit video data/information to the second user 1712 individually. Alternatively, only a single camera is utilized, such that the first user 1710 and the second user 1712 are viewing the same image of a user of the electronic devices during the call. In other examples, during the call, the electronic devices can be detached while maintaining the multi-user video call operation, such that the camera can be moved to transmit other images or video to the users 1710 and 1712. The computing resources of the first electronic device 1700 can be separately designated from the computing resources of the second electronic device 1704 for such an operation, increasing the efficiency of such operations (and, in some cases, permitting such an operation to be conducted as a single device operating independently of other devices may not be capable of such functionality).

Figure 18:
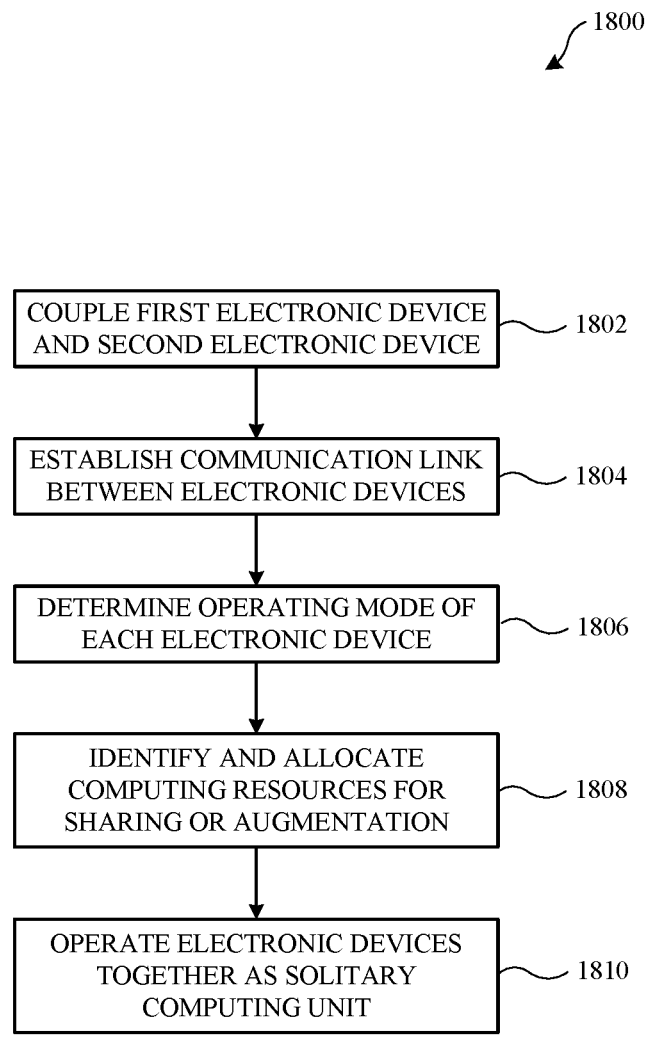
FIG. 18 is a flowchart of steps in a method for coupling electronic devices and determining operational modes for the electronic devices when coupled.

Referring next to FIG. 18, a flowchart 1800 of steps in a method for sharing computing resources between devices is shown. At step 1802, a first electronic device is coupled to a second electronic device. The electronic devices can be coupled via a coupling element, as described above. At step 1804, a communication link is established between the coupled electronic devices. The communication link can be established via connectors on a coupling element that facilitates the coupling of the first and second electronic devices.

At step 1806, an operating mode of each electronic device is determined. When in a coupled configuration, the computing resources (such as processing power, DRAM (dynamic random access memory), memory storage, graphical processing power, input/output resources, communication capabilities, power, etc.) can be shared between the coupled devices. In response to being connected or detecting that a communication link is established between the electronic devices, each device can determine an operational mode in which to operate while coupled. Multiple operational modes may be desired because each electronic device is fully operable independently of the other devices (e.g., the devices are fully functional devices individually) such that mere sharing of computing resources is dictated by the determined operational modes of the electronic devices; for example, the amount of computing resources available to each device can vary between them, a particular operation or setup is desired when in the coupled configuration, and so forth.

Accordingly, operational modes can be triggered (e.g., by detecting connection of the electronic devices) or selected (e.g., by an application installed on one or both of the electronic devices). In some embodiments, operational modes can include conjunctive operational modes that permit an amount of the computing resources of one of the electronic devices to be available for use by the other electronic device. A determination can be made when two electronic devices are coupled as to which electronic device is to be the "primary" device, or device utilizing the main computing resources shared between the electronic devices, and which device is to be the "secondary" device. For example, the electronic device with less computing resources is designated to provide a primary display for the coupled system, and remaining resources of the electronic device may remain unused, such that the other electronic device can utilize those computing resources to augment the other electronic device's own computing power. As such, the primary display presents visual content in accordance with the computing resources and operations of both electronic devices, while the other electronic device has a secondary display, which can be used as an input device for providing data for operation of the coupled configuration. Both devices can have equal computing resources, but it may be desired that one only functions as a primary display, such that the operational mode selected can enable a significant amount of computing resources to be utilized for augmentation of the other device. The operational modes can be specific to the system orientation (e.g., selection of an orientation of the devices from a predetermined set of possible operation orientations). The operational modes can be selected on a sliding basis associated with a desired amount of resources to be shared (e.g., the operational mode may indicate a small, medium, or large amount of resources to be shared). Other operational modes can be selected to increase the efficiency of the coupled configuration or maximize the benefits of particular orientations.

Furthermore, an operational mode can be determined in accordance with power transfer management between the two electronic devices. The power or remaining battery life of each of the devices can be determined, and then power transfer between the devices can be optimized to maximize operating time, consume battery power equally between the devices, provide more power to the primary device, and the like. The operational mode for power management can be dynamically adjusted during operation in accordance with the use of the system.

At step 1808, based on the operational mode determined/selected, an amount of computing resources to be shared and/or used to augment a device are identified and allocated. In a particular example, a first device includes 2 GB of DRAM, and an operational mode that designates the device to operate as only a primary display can be selected, leaving over 1 GB of DRAM unused. In such a situation, 1 GB of DRAM from the device being used as a primary display is allocated for sharing/augmentation of the other device in the coupled configuration. At step 1810, the electronic devices are accordingly operated together as a solitary computing unit, sharing the computing resources as designated or determined by the operational modes selected.

Figure 19:
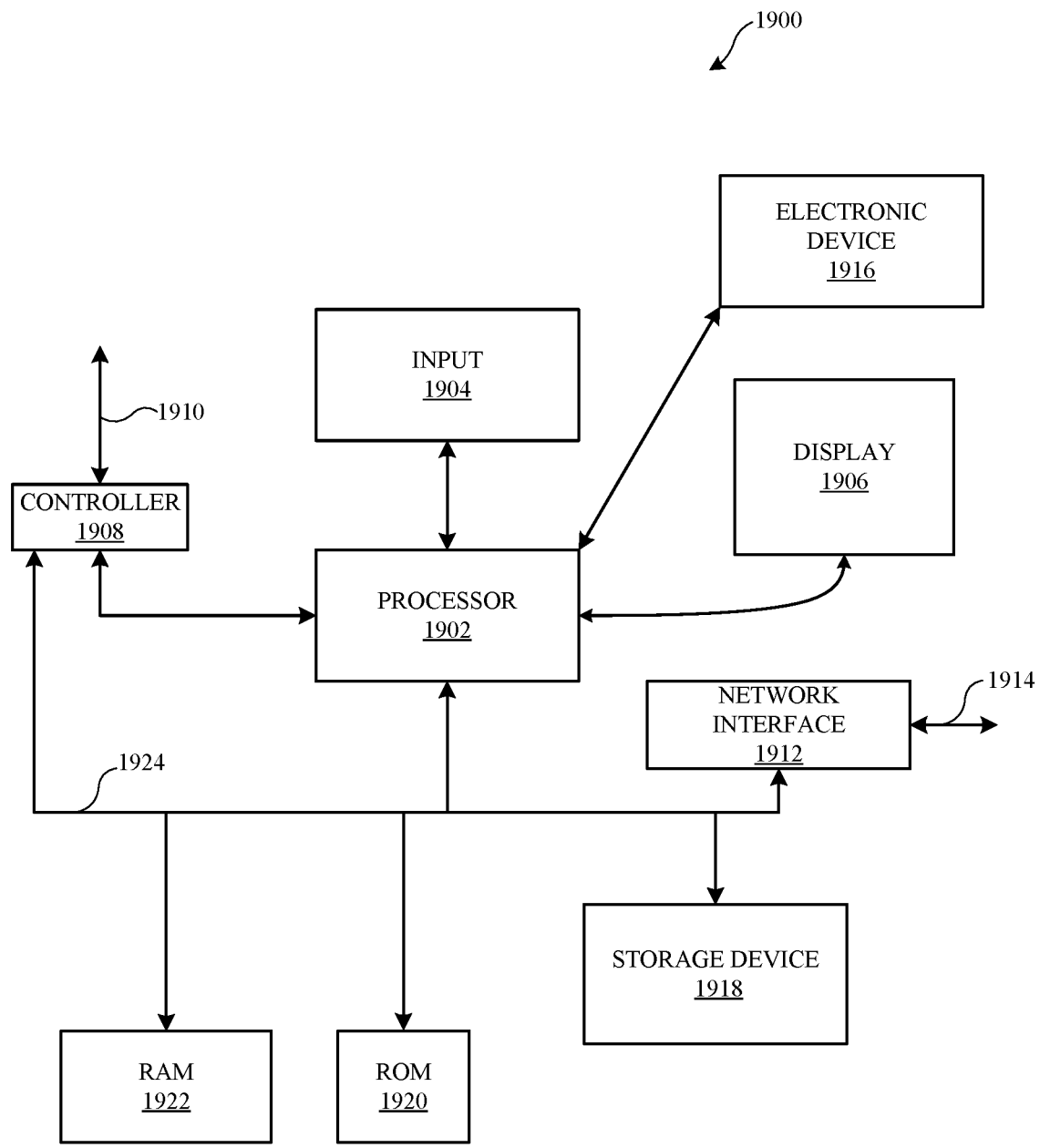
FIG. 19 is a diagram of an example computing system utilized in electronic devices.

FIG. 19 is a block diagram of a computing device 1900 that can use the structures with the magnetic materials and can be used to form the deposited and integrated magnetic materials of the disclosed embodiments. It will be appreciated that the components, devices or elements illustrated in and described with respect to FIG. 19 may not be mandatory and thus some may be omitted in certain embodiments. The computing device 1900 can include a processor 1902 that represents a microprocessor, a coprocessor, circuitry and/or a controller for controlling the overall operation of the computing device 1900. Although illustrated as a single processor, it can be appreciated that the processor 1902 can include a plurality of processors. The plurality of processors can be in operative communication with each other and can be collectively configured to perform one or more functionalities of the computing device 1900 as described herein. In some embodiments, the processor 1902 can be configured to execute instructions that can be stored at the computing device 1900 and/or that can be otherwise accessible to the processor 1902. As such, whether configured by hardware or by a combination of hardware and software, the processor 1902 can be capable of performing operations and actions in accordance with embodiments described herein.

The computing device 1900 can also include a user input device 1904 that allows a user of the computing device 1900 to interact with the computing device 1900. For example, the user input device 1904 can take a variety of forms, such as a button, keypad, dial, touch screen, audio input interface, visual/image capture input interface, input in the form of sensor data, etc. Still further, the computing device 1900 can include a display 1906 (screen display) that can be controlled by the processor 1902 to display information to a user. A controller 1908 can be used to interface with and control different equipment through an equipment control bus 1910. The computing device 1900 can also include a network/bus interface 1912 that couples to a data link 1914. The data link 1914 can allow the computing device 1900 to couple to a host computer or to accessory devices. The data link 1914 can be provided over a wired connection or a wireless connection. In the case of a wireless connection, network/bus interface 1912 can include a wireless transceiver. The computing device 1900 can also include an electronic device 1916 that includes a deposited and integrated magnetic material coupled to the processor 1902.

The computing device 1900 can also include a storage device 1918, and a storage management module that manages one or more partitions (also referred to herein as "logical volumes") within the storage device 1918. In some embodiments, the storage device 1918 can include flash memory, semiconductor (solid state) memory or the like. Still further, the computing device 1900 can include Read-Only Memory (ROM) 1920 and Random Access Memory (RAM) 1922. The ROM 1920 can store programs, code, instructions, utilities or processes to be executed in a non-volatile manner. The RAM 1922 can provide volatile data storage, and store instructions related to components of the storage management module that are configured to carry out the various techniques described herein. The computing device 1900 can further include data bus 1924. The data bus 1924 can facilitate data and signal transfer between at least the processor 1902, the controller 1908, the network/bus interface 1912, the storage device 1918, the ROM 1920, and the RAM 1922. The various aspects, embodiments, implementations or features of the described embodiments can be used separately or in any combination.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic computer system, comprising:
 a first electronic device having a first display and first computing resources;
 a second electronic device having a second display and second computing resources; and
 a coupling element comprising i) a first part coupled to the first electronic device and ii) a second part coupled to the second electronic device, the first part rotationally coupled to the second part, wherein the coupling element is configured to provide a communication path between the first electronic device and the second electronic device,
 wherein, when the first electronic device is coupled to the second electronic device via the communication path, the first electronic device utilizes the first computing resources and the second computing resources and the second display is operable as a secondary display configured to provide data to the first electronic device.

2. The electronic computer system of claim 1, wherein the second computing resources comprises at least one of an operating system, a memory storage, or a power storage.

3. The electronic computer system of claim 1, wherein, when the first electronic device is uncoupled from the second electronic device, the first electronic device and the second electronic device are independently operable.

4. The electronic computer system of claim 1, wherein, when the first electronic device is coupled to the second electronic device via the communication path, the first computing resources are configured to be utilized by the second electronic device to augment the second computing resources.

5. The electronic computer system of claim 1, wherein the communication path comprises a wireless communication path.

6. The electronic computer system of claim 1, wherein the first electronic device is configured in a conjunctive operational mode when the first electronic device is coupled to the second electronic device via the communication path of the coupling element, the conjunctive operational mode permitting the first computing resources to be identified as available for use by the second electronic device.

7. The electronic computer system of claim 6, wherein the first electronic device switches to the conjunctive operational mode in response to establishing a connection via the communication path between the first electronic device and the second electronic device.

8. A coupling element for coupling a first electronic device having first computing resources and a first display and a second electronic device having second computing resources and a second display, the coupling element comprising:
 a body element including a first part having a first securing feature capable of attaching to the first electronic device and a second part having a second securing feature capable of attaching to the second electronic device, wherein the first part is rotationally coupled to the second part and vice versa; and
 a communication path positioned between the first part of the body element and the second part of the body element, the communication path being configured to enable the first electronic device to communicate with the second electronic device,
 wherein the first electronic device and the second electronic device are enabled to share the respective computing resources using the communication path provided by the coupling element when the first electronic device and the second electronic device are attached to the body element by way of the first securing feature and the second securing feature respectively.

9. The coupling element of claim 8, wherein the communication path is disposed within the body element and extends between the first securing feature and the second securing feature.

10. The coupling element of claim 9, the body element further comprising a rotating hinge portion that facilitates rotation of the first securing feature at the first part of the body element with respect to the second securing feature at the second part of the body element,
 wherein the communication path further extends through the rotating hinge portion such that the communication path is flexible in response to rotation of the first securing feature with respect to the second securing feature.

11. The coupling element of claim 8, wherein when the first electronic device and the second electronic device are attached to the body element, the second electronic device is configured to augment the computing resources of the second electronic device with the computing resources shared by the first electronic device.

12. The coupling element of claim 11, wherein the first display of the first electronic device is configured to operate as a primary display of the attached first electronic device and the second electronic device when the second electronic device is augmenting its computing resources with the computing resources shared by the first electronic device.

13. The coupling element of claim 8, wherein the first securing feature includes at least one magnet configured to form a magnetic circuit with a magnetic element of the first electronic device such that formation of the magnetic circuit attaches the first electronic device to the first securing feature.

14. An electronic device, comprising:
 a first display;
 a housing coupled with the first display, the housing defining an internal cavity that carries first computing resources including one or more of processing power, dynamic random access memory, memory storage capacity, or graphical processing memory;
 a communication port defined by an opening in the housing; and
 a coupling element having a first connector connected to the communication port and a second connector capable of being connected to a second electronic device, the second electronic device including a second display, a second housing coupled to the second display, second computing resources carried by the second housing, and a second communication port,
 wherein, when connected via a communication path provided by the coupling element, the first computing resources and the second electronic device are operable together such that the second electronic device computing resources is provided access to the first computing resources and the second electronic device provides the first computing resources with access to the second computing resources.

15. The electronic device of claim 14, wherein the second display is operable as a primary display when the first computing resources and the second electronic device are operable together.

16. The electronic device of claim 15, wherein when the second display operates as the primary display, the first computing resources are augmented with at least a portion of the second computing resources shared by the second electronic device.

17. The electronic device of claim 14, wherein the first computing resources and the second computing resources comprise battery power that is shared between the first computing resources and the second electronic device.

18. The electronic device of claim 14, wherein the coupling element comprises a hinged connector configured to facilitate rotation of the electronic device with respect to the second electronic device.

19. The electronic device of claim 18, wherein the hinged connector includes a resistive force such that the coupling element is capable of maintaining the first display in a fixed orientation with respect to the second electronic device.

20. The electronic device of claim 19, further comprising a camera and is operable to conduct a video call.

* * * * *